(12) United States Patent
Negri Jimenez et al.

(10) Patent No.: US 12,186,976 B2
(45) Date of Patent: Jan. 7, 2025

(54) THREE-DIMENSIONAL PRINTING WITH TINTED ANTI-COALESCING AGENTS

(71) Applicant: HEWLETT-PACKARD DEVELOPMENT COMPANY, L.P., Spring, TX (US)

(72) Inventors: Graciela Emma Negri Jimenez, San Diego, CA (US); Emre Hiro Discekici, San Diego, CA (US); Shannon Reuben Woodruff, San Diego, CA (US); Jacob Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 177 days.

(21) Appl. No.: 17/777,742

(22) PCT Filed: Dec. 9, 2019

(86) PCT No.: PCT/US2019/065141
§ 371 (c)(1),
(2) Date: May 18, 2022

(87) PCT Pub. No.: WO2021/118518
PCT Pub. Date: Jun. 17, 2021

(65) Prior Publication Data
US 2023/0001630 A1    Jan. 5, 2023

(51) Int. Cl.
*B29C 64/112* (2017.01)
*B29C 64/165* (2017.01)
*B29K 83/00* (2006.01)
(Continued)

(52) U.S. Cl.
CPC .......... *B29C 64/112* (2017.08); *B29C 64/165* (2017.08); *B29K 2083/00* (2013.01);
(Continued)

(58) Field of Classification Search
CPC . B29C 64/112; B29C 64/165; B29K 2083/00; B29K 2995/002; B33Y 10/00; B33Y 30/00; B33Y 70/00
See application file for complete search history.

(56) References Cited

U.S. PATENT DOCUMENTS

| 9,120,939 B2 | 9/2015 | Chopra et al. |
| 2003/0221586 A1* | 12/2003 | Arase ..................... C09D 11/38 106/31.86 |

(Continued)

FOREIGN PATENT DOCUMENTS

| WO | 2017/019102 A1 | 2/2017 | |
| WO | WO-2018075035 A1 * | 4/2018 | ............. B29C 35/16 |

(Continued)

*Primary Examiner* — Timothy Kennedy
*Assistant Examiner* — Inja Song
(74) *Attorney, Agent, or Firm* — HP Inc. Patent Department (57) ABSTRACT

The present disclosure describes multi-fluid kits for three-dimensional printing, three-dimensional printing kits, and methods of making three-dimensional printed objects. In one example, a multi-fluid kit for three-dimensional printing can include a fusing agent and a tinted anti-coalescing agent. The fusing agent can include water and an electromagnetic radiation absorber that absorbs radiation energy and converts the radiation energy to heat. The tinted anti-coalescing agent can include an aqueous liquid vehicle, a colored dye dissolved in the aqueous liquid vehicle, and an organosilane. The organosilane can have a central silicon atom covalently coupled to multiple hydrolysable groups and to an organic group by covalent bonding to a carbon atom in the organic group, wherein the organic group is not susceptible to hydrolysis.

18 Claims, 4 Drawing Sheets

(51) Int. Cl.
*B33Y 10/00* (2015.01)
*B33Y 30/00* (2015.01)
*B33Y 70/00* (2020.01)

(52) U.S. Cl.
CPC .......... *B29K 2995/002* (2013.01); *B33Y 10/00* (2014.12); *B33Y 30/00* (2014.12); *B33Y 70/00* (2014.12)

(56) References Cited

U.S. PATENT DOCUMENTS

| | | | |
|---|---|---|---|
| 2005/0014864 A1* | 1/2005 | Akers | C09D 11/324 523/161 |
| 2008/0115695 A1* | 5/2008 | Sujeeth | C09D 7/41 106/499 |
| 2008/0121138 A1* | 5/2008 | Kennedy | C09D 7/41 106/14.11 |
| 2008/0266349 A1* | 10/2008 | McGorrin | C09D 11/54 106/31.13 |
| 2012/0092428 A1* | 4/2012 | Ganapathiappan | C09B 7/00 524/88 |
| 2013/0079453 A1 | 3/2013 | Kraiter et al. | |
| 2017/0312983 A1* | 11/2017 | Birecki | B29C 64/112 |
| 2018/0050491 A1* | 2/2018 | Ishihara | B33Y 10/00 |
| 2018/0244854 A1 | 8/2018 | Drazba et al. | |
| 2019/0160532 A1 | 5/2019 | Erickson et al. | |

FOREIGN PATENT DOCUMENTS

| | | | |
|---|---|---|---|
| WO | WO-2018144181 A1 * | 8/2018 | ................ B41J 2/01 |
| WO | WO-2018199994 A1 * | 11/2018 | ................ A61J 3/06 |
| WO | 2019/053258 A1 | 3/2019 | |
| WO | 2019/069032 A1 | 4/2019 | |
| WO | 2019/108201 A1 | 6/2019 | |
| WO | WO-2019108288 A1 * | 6/2019 | ........... B29C 64/124 |

* cited by examiner

THREE-DIMENSIONAL PRINTING WITH TINTED ANTI-COALESCING AGENTS

BACKGROUND

Methods of three-dimensional (three-dimensional) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. This technology has been somewhat limited with respect to commercial production capabilities because the range of materials used in three-dimensional printing has been likewise limited. Accordingly, it can be difficult to three-dimensional print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

Multi-fluid kits, three-dimensional printing kits, and methods described herein can be used to make three-dimensional printed objects with increased uniformity of surface color. Layers of the three-dimensional printed objects can be formed by applying a fusing agent to polymer particles and fusing the polymer particles by heating. A tinted anti-coalescing agent can be applied around edges of individual layers of the three-dimensional printed objects and a colored dye in the tinted anti-coalescing agent can color the surface of the object while an organosilane in the tinted anti-coalescing agent can polymerize to form a polysiloxane barrier to separate fused polymer particles from unfused polymer particles. In one example, a multi-fluid kit for three-dimensional printing includes a fusing agent and a tinted anti-coalescing agent. The fusing agent includes water and an electromagnetic radiation absorber, wherein the electromagnetic radiation absorber absorbs radiation energy and converts the radiation energy to heat. The tinted anti-coalescing agent includes an aqueous liquid vehicle, a colored dye dissolved in the aqueous liquid vehicle, and an organosilane having a central silicon atom covalently coupled to multiple hydrolysable groups and to an organic group by covalent bonding to a carbon atom in the organic group, wherein the organic group is not susceptible to hydrolysis. In some examples, the hydrolysable groups can include alkoxy groups, halogen groups, or a combination thereof. In further examples, the organic group of the organosilane can include a C6 to C24 aliphatic or alicyclic hydrocarbon or a C6 to C24 aliphatic or alicyclic hydrocarbon directly coupled to a heteroatom selected from the group consisting of oxygen, nitrogen, sulfur, and combinations thereof, and the organosilane can be emulsified in the aqueous liquid vehicle by a surfactant. In other examples, the organic group of the organosilane can include a polyethylene oxide, polyethylene oxide urethane, amine, glycidyl, or succinic anhydride, and the organosilane can be dissolved in the aqueous liquid vehicle. In certain examples, the organosilane can be present in the tinted anti-coalescing agent at from about 1 wt % to about 20 wt %. In further examples, the colored dye can be a black dye. In still further examples, the colored dye can be present in the tinted anti-coalescing agent at an amount from about 0.1 wt % to about 3 wt %. In certain examples, the tinted anti-coalescing agent can include from about 60 wt % to about 93 wt % water and from about 5 wt % to about 35 wt % organic co-solvent.

The present disclosure also describes three-dimensional printing kits. In one example, a three-dimensional printing kit includes a powder bed material, a fusing agent, and a tinted anti-coalescing agent. The powder bed material includes polymer particles. The fusing agent includes water and an electromagnetic radiation absorber, wherein the electromagnetic radiation absorber absorbs radiation energy and converts the radiation energy to heat. The tinted anti-coalescing agent includes an aqueous liquid vehicle, a colored dye dissolved in the aqueous liquid vehicle, and an organosilane having a central silicon atom coupled to multiple hydrolysable groups and to an organic group by covalent bonding to a carbon atom in the organic group, wherein the organic group is not subject to hydrolysis. In some examples, the polymer particles can include polyamide 6, polyamide 9, polyamide 11, polyamide 12, polyamide 6/6, polyamide 6/12, polyethylene, thermoplastic polyurethane, polypropylene, polyester, polycarbonate, polyether ketone, polyacrylate, polystyrene powder, wax, or a combination thereof. In further examples, the organic group of the organosilane can include: a C6 to C24 aliphatic or alicyclic hydrocarbon; a C6 to C24 aliphatic or alicyclic hydrocarbon directly coupled to a heteroatom selected from the group consisting of oxygen, nitrogen, sulfur, and combinations thereof; polyethylene oxide; polyethylene oxide urethane; amine; glycidyl; or succinic anhydride. In still further examples, the tinted anti-coalescing agent can include from about 60 wt % to about 93 wt % water, from about 5 wt % to about 35 wt % organic co-solvent, from about 0.1 wt % to about 3 wt % of the colored dye, and from about 1 wt % to about 20 wt % of the organosilane, based on the total weight of the tinted anti-coalescing agent.

The present disclosure also describes methods of making three-dimensional printed objects. In one example, a method of making a three-dimensional printed object includes iteratively applying individual powder bed material layers of polymer particles to a powder bed. A fusing agent is selectively jetted onto the individual powder bed material layers, based on a three-dimensional object model, at build areas where the three-dimensional printed object is being formed. The fusing agent includes water and an electromagnetic radiation absorber. A tinted anti-coalescing agent is also jetted onto individual powder bed material layers, based on the three-dimensional object model, laterally at a border region between a first area where the powder bed material is contacted by the fusing agent and a second area where the powder bed material is not contacted by the fusing agent. The tinted anti-coalescing agent includes an aqueous liquid vehicle, a colored dye dissolved in the aqueous liquid vehicle, and an organosilane having a central silicon atom coupled to multiple hydrolysable groups and to an organic group by covalent bonding to a carbon atom in the organic group, wherein the organic group is not subject to hydrolysis. The powder bed is exposed to energy to selectively fuse the polymer particles in contact with the radiation absorber to form a fused polymer matrix at individual powder bed material layers as well as form a polysiloxane from the organosilane. In certain examples, the organic group of the organosilane can include: a C6 to C24 aliphatic or alicyclic hydrocarbon; a C6 to C24 aliphatic or alicyclic hydrocarbon directly coupled to a heteroatom selected from the group consisting of oxygen, nitrogen, sulfur, and combinations thereof; polyethylene oxide; polyethylene oxide urethane; amine; glycidyl; or succinic anhydride. In further examples, the tinted anti-coalescing agent can include from about 60 wt % to about 93 wt % water, from about 5 wt % to about 35 wt % organic co-solvent, from about 0.1 wt % to about 3 wt % of the colored dye, and from about 1 wt % to about 20 wt % of the organosilane.

It is noted that when discussing the multi-fluid kits, three-dimensional printing kits, and methods herein, these discussions can be considered applicable to one another whether or not they are explicitly discussed in the context of that example. Thus, for example, when discussing a fusing agent related to a three-dimensional printing kit, such disclosure is also relevant to and directly supported in the context of multi-fluid kits and methods, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Multi-Fluid Kits for Three-Dimensional Printing

As mentioned above, in some examples the multi-fluid kits described herein can be used to make three-dimensional printed objects having increased surface color uniformity. The tinted anti-coalescing agent can tint the outer surface of the three-dimensional printed objects. Additionally, the tinted anti-coalescing agent can help reduce undesired fusing of polymer particles surrounding the fused particles making up the three-dimensional printed object. Thermal bleed can cause the surrounding polymer particles to fuse or partially fuse when layers of the three-dimensional printed object are heated and fused. In some cases, this can cause the surrounding particles of powder bed material to become partially fused or caked onto the surface of the three-dimensional printed object. However, the tinted anti-coalescing agents described herein can include an organosilane that can polymerize to form a polysiloxane. The polysiloxane can be formed after the tinted anti-coalescing agent has been applied to the powder bed. In some cases, the tinted anti-coalescing agent can be applied to the border between the area of the powder bed to be fused and the area to remain unfused. The polysiloxane can form a barrier between the fused and unfused areas to prevent unfused polymer particles from partially fusing or caking onto the surface of the three-dimensional printed object.

Additionally, in some examples, three-dimensional printed objects can be made using a fusing agent that includes a black pigment as a radiation absorber. The powder bed material can be white in color, but the black fusing agent can color the fused polymer particles black. However, the surfaces of the three-dimensional printed object can often have a non-uniform color because of polymer particles at the surface that are not fully coated with the black fusing agent. The color may be made more uniform by applying a black coloring agent around the borders of the layers of the three-dimensional printed object. This can cause additional thermal bleed, however, because black colorants can tend to absorb radiation and generate heat. Thus, it has been difficult to make three-dimensional printed objects with uniformly colored surfaces while also controlling thermal bleed. The tinted anti-coalescing agents described herein have been found to be capable of increasing uniformity of the surface color while also controlling thermal bleed. In particular, the polysiloxane formed from the organosilane can be a barrier to prevent surrounding polymer particles from partially fusing or caking onto the surface of the three-dimensional printed object. In some examples, the polysiloxane barrier can prevent particles from coalescing, even if the particles heat up to a softening or melting point. Thus, particles on which the tinted anti-coalescing agent has been applied can remain as separate, loose particles.

Figure 1:
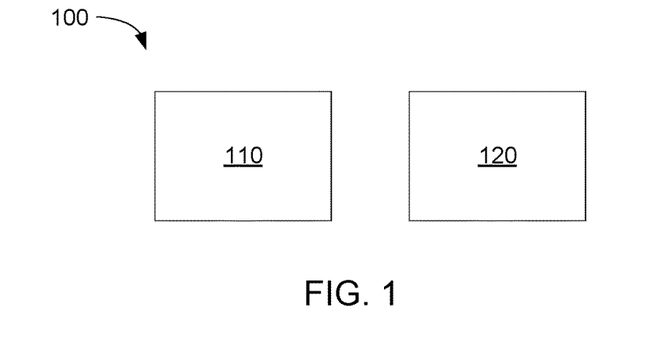
FIG. 1 is a schematic view of an example multi-fluid kit for three-dimensional printing in accordance with examples of the present disclosure.

With this description in mind, FIG. 1 shows a schematic of an example multi-fluid kit 100 for three-dimensional printing. The kit can include a fusing agent 110 and a tinted anti-coalescing agent 120. The fusing agent can include water and an electromagnetic radiation absorber that can absorb radiation energy, e.g., electromagnetic radiation energy, and convert the radiation energy to heat. The tinted anti-coalescing agent can include an aqueous liquid vehicle, a colored dye dissolved in the aqueous liquid vehicle, and an organosilane. The organosilane can have a central silicon atom covalently coupled to multiple hydrolysable groups and to an organic group by covalent bonding to a carbon atom in the organic group, wherein the organic group is not susceptible to hydrolysis. In some examples, the tinted anti-coalescing agent can be printed around the edges of the portion of the powder that is printed with the fusing agent. The tinted anti-coalescing agent can increase selectivity between the fused and unfused portions of the powder bed by forming a polysiloxane barrier between the fused and unfused areas.

In one example, the organosilanes can be present in the tinted anti-coalescing agent at from about 1 wt % to about 20 wt %, from about 2 wt % to about 15 wt %, or from about 2 wt % to about 10 wt %, for example. In further examples, the tinted anti-coalescing agent can also include water and an organic co-solvent. In certain examples, the tinted anti-coalescing agent can include from about 60 wt % to about 93 wt % water and from about 5 wt % to about 35 wt % organic co-solvent. In a particular example, the tinted anti-coalescing agent can include from about 60 wt % to about 93 wt % water, from about 5 wt % to about 35 wt % organic co-solvent, from about 0.1 wt % to about 3 wt % colored dye, and from about 1 wt % to about 20 wt % of the organosilane, based on the total weight of the tinted anti-coalescing agent.

Specific examples of organosilanes that can be included in the tinted anti-coalescing agent are described in more detail below.

The tinted anti-coalescing agent can also include a colored dye. The colored dye can impart a color to particles of powder bed material onto which the anti-coalescing agent is applied. In certain examples, the anti-coalescing agent can be applied to powder bed material at or near the borders of the area to be fused. Thus, the polymer particles that are at the edge of the area to be fused can be colored by the colored dye. When the completed three-dimensional printed object is formed, these particles can be located on exterior surfaces of the three-dimensional printed object. Therefore, when the tinted anti-coalescing agent is applied to the powder bed in this way, the colored dye can color the surfaces of the final three-dimensional printed object.

In certain examples, the colored dye can be a black dye. This can be especially useful when the fusing agent used to fuse the polymer particles is black. In further examples, the colored dye can be selected to match the color of the fusing agent, or the color that the polymer particles take on after the fusing agent has been jetted thereon. In further examples, the colored dye in the anti-coalescing agent can be another color other than black. A three-dimensional printed object can be formed having a different color, either by the use of a colored fusing agent or a separate colored agent that is applied during three-dimensional printing. Non-limiting examples of dyes that can be used in the tinted anti-coalescing agent can include the C.I. Direct series of dyes. In certain examples, the colored dye can be a C.I. Direct Black series dye.

In some examples, the colored dye can be dissolved in the tinted anti-coalescing agent. In certain examples, the dye can be soluble in water and/or in the liquid vehicle of the tinted anti-coalescing agent. In further examples, the dye can be soluble up to 3 wt % or more based on the weight of the dissolved dye with respect to the total weight of the tinted anti-coalescing agent. In other examples, the dye can be soluble up to 4 wt % or more or up to 5 wt % or more. The amount of dye included in the tinted anti-coalescing agent can be selected, depending on the strength of coloring desired and on the solubility of the dye. In some examples, the dye can be included at a concentration from about 0.1 wt % to about 3 wt % with respect to the total weight of the tinted anti-coalescent agent. In further examples, the dye can be included in a concentration from about 0.2 wt % to about 2.5 wt % or from 0.5 wt % to about 2 wt %.

As mentioned above, in some examples the colored dye can absorb radiation and produce heat. In the three-dimensional printing processes described herein, individual layers of the three-dimensional printed object can be formed by irradiating the powder bed to fuse polymer particles where a fusing agent has been applied. However, if the colored dye also absorbs radiation and generates heat then this can contribute to thermal bleed and partial fusing or caking of polymer particles surrounding the three-dimensional printed part. Accordingly, in some examples the concentration of dye can be adjusted so that the amount of heat generated by the dye is manageable. In particular, the tinted anti-coalescing agent can include a sufficient amount of the organosilane so that any adverse effects of the heat generated by the dye can be counteracted by the polysiloxane barrier. Even if the colored dye generates some heat in the area where the tinted anti-coalescent agent is applied, the polysiloxane barrier formed from the tinted anti-coalescing agent can be sufficient to prevent or reduce the caking and partial fusing of surrounding polymer particles. At the same time, the amount of dye can be sufficient to provide good color uniformity to the surface of the three-dimensional printed object. In certain examples, a weight ratio of the colored dye to the organosilane in the tinted anti-coalescing agent can be from about 1:100 to about 1:1, or from about 1:50 to about 1:2, or from about 1:40 to about 1:5.

In some examples, the tinted anti-coalescing agent can be mostly water. In a particular example, the tinted anti-coalescing agent can be about 80 wt % to about 99 wt % water. In further examples, the tinted anti-coalescing agent can be about 85 wt % to 99 wt % water, or about 90 wt % to 99 wt % water.

The tinted anti-coalescing agent can also include ingredients to allow the tinted anti-coalescing agent to be jetted by a fluid jet printhead. In some examples, the tinted anti-coalescing agent can include jettability imparting ingredients such as those in the fusing agent described below. These ingredients can include a liquid vehicle, surfactant, dispersant, co-solvent, biocides, viscosity modifiers, materials for pH adjustment, sequestering agents, preservatives, and so on. These ingredients can be included in any of the amounts described below.

In some examples, the tinted anti-coalescing agent can include a detailing compound that can reduce the temperature of powder bed material, such as a solvent that evaporates at the temperature of the powder bed. In certain examples, if used, the detailing compound can be water and/or an organic co-solvent. Non-limiting examples of co-solvents for use in the tinted anti-coalescing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, 2-pyrrolidone, 1-(2-hydroxyethyl)-2-pyrrolidone, and combinations thereof. Other examples of co-solvents can include any of the co-solvents disclosed for use in the fusing agents described below.

Turning to the fusing agent mentioned above, in some examples the fusing agent can include an electromagnetic radiation absorber that is capable of absorbing electromagnetic radiation to produce heat. The radiation absorber can be colored or colorless. In certain examples, the radiation absorber can have a color that matches the color of the colored dye in the tinted anti-coalescing agent. In a particular example, the tinted anti-coalescing agent can include a black dye, and the radiation absorber in the fusing agent can also be black in color.

In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PE DOT: PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used in the fusing agent. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments that can be used in the fusing agent include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber in the fusing agent can include a metal dithiolene complex. Transition metal dithiolene complexes can exhibit a strong absorption band in the 600 nm to 1600 nm region of the electromagnetic spectrum. In some examples, the central metal atom can be any metal that can form square planar complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, like the tinted anti-coalescing agent, the fusing agent can be applied onto the powder bed material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation of the fusing agent and/or the tinted anti-coalescing agent can be water or can be an aqueous liquid vehicle that includes water and a co-solvent or co-solvents present in total at from about 1 wt % to about 50 wt %, depending on the application architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

Classes of co-solvents that can be used in the fusing agent and/or the tinted anti-coalescing agent can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

The fusing agent and/or the tinted anti-coalescing agent can include a surfactant or multiple surfactants such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be used to enhance certain properties of the fusing agent and/or the tinted anti-coalescing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt.

Three-Dimensional Printing Kits

Figure 2:
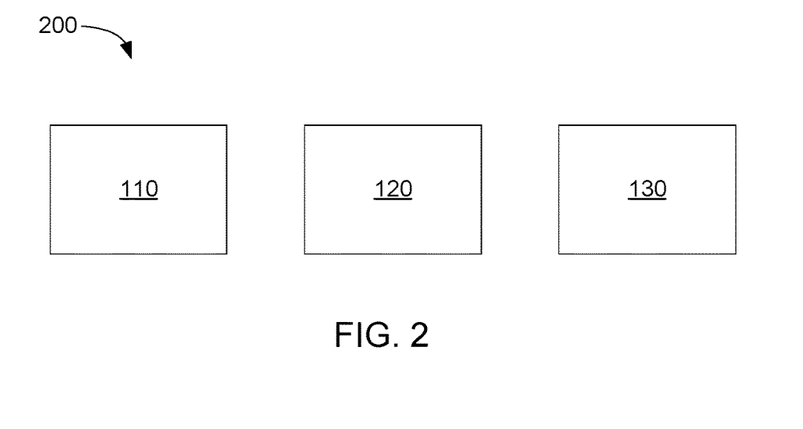
FIG. 2 is a schematic view an example three-dimensional printing kit in accordance with examples of the present disclosure.

The present disclosure also describes three-dimensional printing kits 200, as shown schematically in FIG. 2. In some examples, the three-dimensional printing kits can include materials that can be used in the three-dimensional printing processes described herein. More specifically, the three-dimensional printing kits described herein can include a powder bed material 130 including polymer particles, as well as the fusing agent 110 and the tinted anti-coalescing agent 120 described previously in relation to the multi-fluid kit for three-dimensional printing.

With more specific reference to the powder bed material, this material can include polymer particles having a variety of shapes, such as spherical particles or irregularly-shaped particles. The polymer particles can be present in the powder bed material at from about 60 wt % to 100 wt %, from about 80 wt % to 100 wt % polymer particles, from about 90 wt % to 100 wt % polymer particles, from about 95 wt % to 100 wt % polymer particles, or from about 60 wt % to about 99 wt % polymer particles. In some examples, the polymer powder can be capable of being formed into three-dimensional printed objects with a resolution of about 20 μm to about 100 μm, about 30 μm to about 90 μm, or about 40 μm to about 80 μm. As used herein, "resolution" refers to the size of the smallest feature that can be formed on a three-dimensional printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from 40 μm to about 80 μm.

The polymer powder can have a melting or softening point from about 70° C. to about 350° C. In further examples, the polymer can have a melting or softening point from about 150° C. to about 200° C. A variety of polymer particles with melting points or softening points in these ranges can be used, including thermoplastic polymer particles. For example, the polymer powder can include polyamide 6 powder, polyamide 9 powder, polyamide 11 powder, polyamide 12 powder, polyamide 6/6 powder, polyamide 6/12 powder, polyethylene powder, wax, thermoplastic polyamide, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or a mixture thereof. In a specific example, the polymer powder can be polyamide 12, which can have a melting point from about 175° C. to about 200° C. In another specific example, the polymer powder can be thermoplastic polyurethane.

The polymer particles can also, in some cases, be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, if other components are present such as a filler, a weight ratio of polymer particles to filler particles can be from about 100:1 to about 1:2 or from about 5:1 to about 1:1.

Three-Dimensional Printing Methods

Figure 3A:
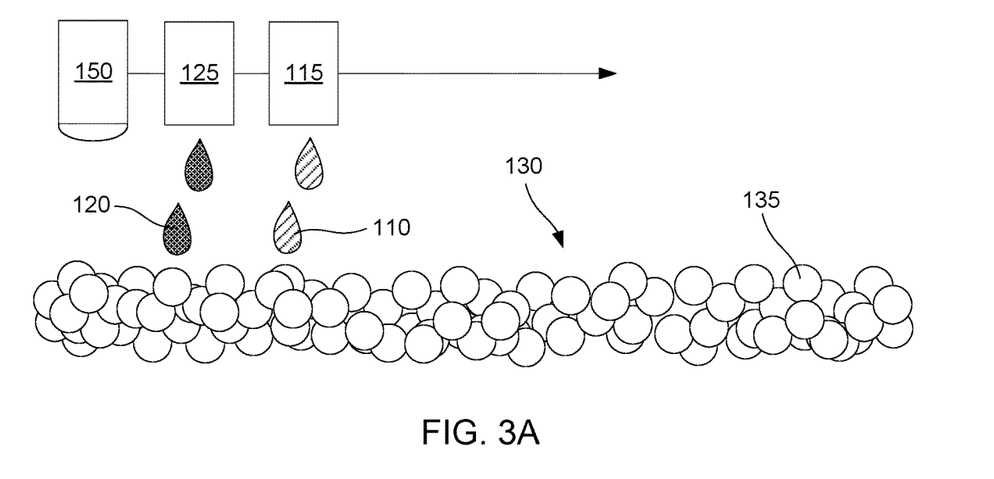
FIGS. 3A-3C show a schematic view of an example three-dimensional printing process using an example three-dimensional printing kit in accordance with examples of the present disclosure.

FIGS. 3A to 3C and FIG. 4 illustrate methods of printing or forming three-dimensional objects in accordance with the present disclosure. In FIG. 3A, a fusing agent 110 is shown in the form of an ejected droplet from a fusing agent ejector 115, a tinted anti-coalescing agent 120 shown in the form of an ejected from a tinted anti-coalescing agent ejector 125, and a powder bed material 130, which includes polymer particles 135, is also shown. Thus, in an example, the fusing agent and the tinted anti-coalescing agent can be ejected or jetted onto the powder bed, which includes a layer of the powder bed material 130, e.g., polymer particles and in some instances other particles may be present, where the fusing agent promotes fusing of the polymer particles together (inter-particulate and layer to layer), and the tinted anti-coalescing agent provides a physical barrier to prevent coalescence of neighboring melted polymer particles when ejected at or near a border region of the part that is being formed through the three-dimensional printing process. The tinted anti-coalescing agent also colors the polymer particles in the border region as explained above. The fluid ejectors can move across the layer of powder bed material to selectively jet fusing agent on areas that are to be fused, while the tinted anti-coalescing agent can be jetted onto areas that are to be cooled. A radiation source 150 can also move across the layer of powder bed material.

In some cases, the powder bed can be preheated to a preheat temperature within about 10° C. to about 70° C. of the fusing temperature of the polymer powder. Depending on the type of polymer powder used, the preheat temperature can be in the range of about 90° C. to about 250° C., or about 90° C. to about 200° C., for example. The tinted anti-coalescing agent can include a solvent that evaporates when it comes into contact with the powder bed at the preheat temperature, thereby cooling the printed portion of the powder bed through evaporative cooling.

The amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are about 100 microns thick, then the fusing agent can penetrate about 100 microns into the polymer powder. Thus, the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

As described above, the tinted anti-coalescing agent can include a fluid that reduces a temperature of the polymer powder on which the tinted anti-coalescing agent is printed. In particular, a maximum temperature reached by the powder during exposure to electromagnetic energy can be less in the areas where the tinted anti-coalescing agent is applied. In some examples, the tinted anti-coalescing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the powder bed material), the tinted anti-coalescing agent can be applied to these areas. Thus, the tinted anti-coalescing agent can be applied at areas where there is a border region positioned laterally between the printed object and the unprinted powder bed material, and can also be printed anywhere where the printed object may benefit from a cooling effect provided by the tinted anti-coalescing agent.

Figure 3B:
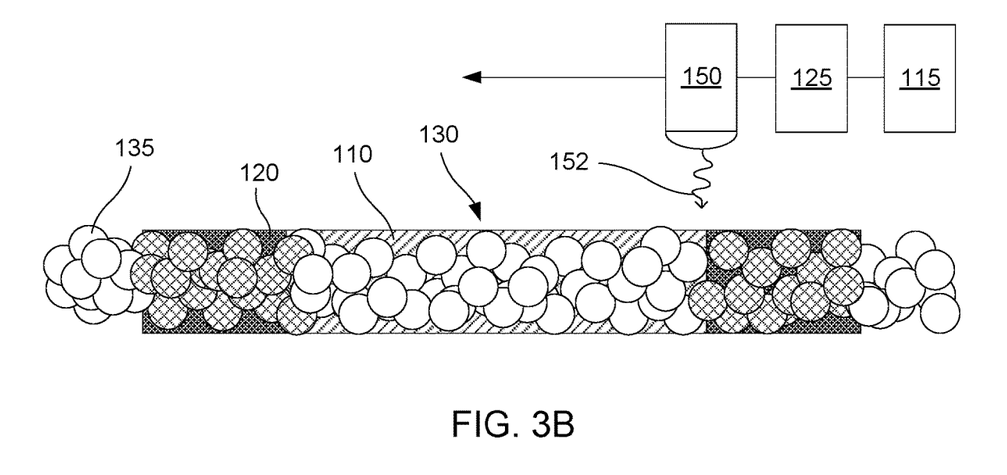

FIG. 3B shows the layer of powder bed material 130 after the fusing agent 110 and the tinted anti-coalescing agent 120 have been jetted onto respective areas of the powder bed to be fused and/or to provide thermal insulation or cooling at or around the object that is being printed on a layer by layer basis. The colored dye can be dissolved in the aqueous liquid vehicle. The fusing agent is jetted where the object is to be fused, and the tinted anti-coalescing agent is jetted onto areas adjacent to the edges of the area to be fused. In this figure, the radiation source 150 is shown emitting radiation 152 toward the layer of powder build material shown, which is part of a powder bed (not shown in full but shown in part as one of the layers of the powder bed).

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 seconds to about 10 seconds per pass.

Figure 3C:
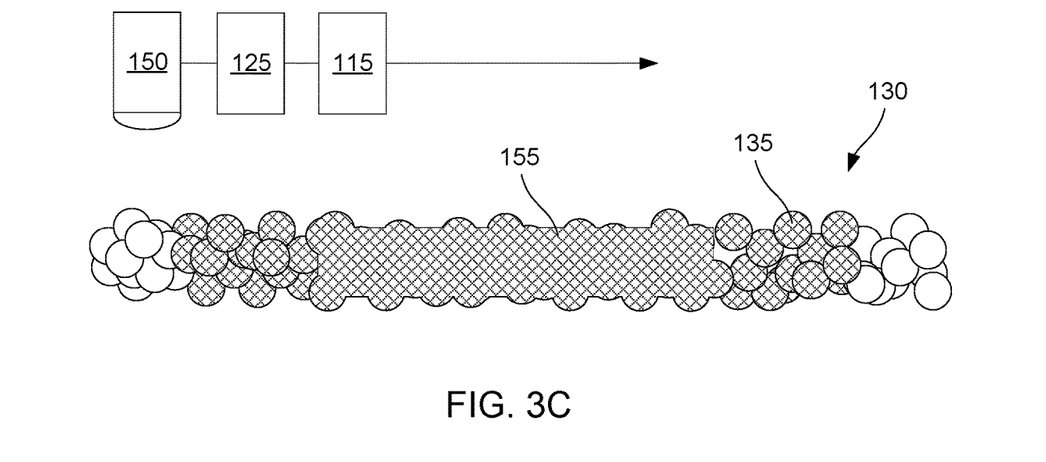

FIG. 3C shows the layer of powder bed material 130 with a fused portion 155 where the fusing agent was jetted and the radiation (152 of FIG. 3B) has interacted with the fusing agent to cause the polymer particles 135 of the powder bed material to fuse. In this example, a combination of the presence of the radiation absorber and the radiation together raise the temperature to cause the polymer particles to fuse and form the object. The area where the tinted anti-coalescing agent was jetted remains as loose polymer particles, due in part to the cooling effect of the tinted anti-coalescing agent and also due to the polysiloxane barrier formed from polymerizing the organosilane in the tinted anti-coalescing agent. As shown by the shading in this figure, the polymer particles where the tinted anti-coalescing agent was printed are colored the same color as the fused portion. Therefore, even if some of these adjacent particles are caked onto the fused portion or partially fused onto the fused portion, the surface color of the final three-dimensional printed object will be uniform.

Figure 4:
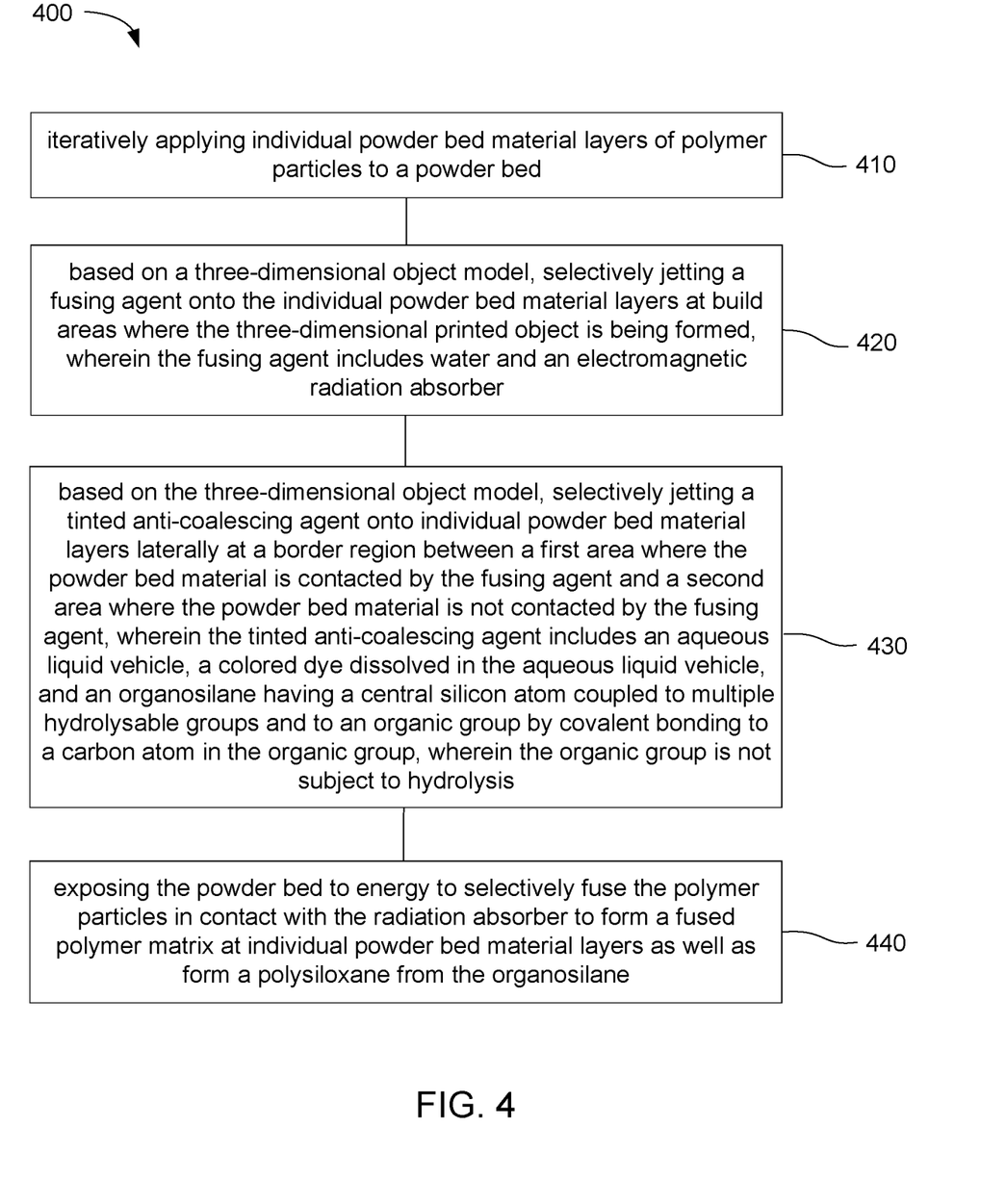
FIG. 4 is a flowchart illustrating an example method of making a three-dimensional printed object in accordance with examples of the present disclosure.

In further detail, this printing technology can be implemented in accordance with a method 400 of three-dimensional printing shown in FIG. 4. By way of example, the method can include iteratively applying 410 individual powder bed material layers of polymer particles to a powder bed, and based on a three-dimensional object model, selectively jetting 420 a fusing agent onto the individual powder bed material layers at build areas where the three-dimensional printed object is being formed. The fusing agent in this example includes water and an electromagnetic radiation absorber. The method can further include, based on the three-dimensional object model, selectively jetting 430 a tinted anti-coalescing agent onto individual powder bed material layers laterally at a border region between a first area where the powder bed material is contacted by the fusing agent and a second area where the powder bed material is not contacted by the fusing agent. The tinted anti-coalescing agent can include an aqueous liquid vehicle, a colored dye dissolved in the aqueous liquid vehicle, and an organosilane having a central silicon atom coupled to multiple hydrolysable groups and to an organic group by covalent bonding to a carbon atom in the organic group, wherein the organic group is not subject to hydrolysis. In further detail, the method can include exposing 440 the powder bed to energy to selectively fuse the polymer particles in contact with the radiation absorber to form a fused polymer matrix at individual powder bed material layers as well as form a polysiloxane from the organosilane.

In some examples, the method can also further include selectively applying the tinted anti-coalescing agent to build areas to control a temperature of a layer or layers of the three-dimensional printed object while being formed. As described above, the tinted anti-coalescing agent can also include a colored dye. In certain examples, the colored dye can be a black dye and the black dye can be included in an amount from about 0.1 wt % to about 3 wt % with respect to the total weight of the tinted anti-coalescing agent. In further examples, the tinted anti-coalescing agent can also include water in an amount from about 60 wt % to about 93 wt %, an organic co-solvent in an amount from about 5 wt % to about 35 wt %, and the organosilane in an amount from about 1 wt % to about 20 wt %.

The three-dimensional printed object can be formed by applying, e.g., jetting, ejecting, etc., a fusing agent onto layers of powder bed material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. The three-dimensional object model can define the three-dimensional shape of the object. Other information may also be included, such as structures to be formed of additional different materials or color data for printing the object with various colors at different locations on the object. The three-dimensional object model may also include features or materials specifically related to application fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, concentration of the organosilanes applied, and so on. All this information can be contained in a single three-dimensional object file or a combination of multiple files. The three-dimensional printed object can be made based on the three-dimensional object model. In certain examples, software can be used to convert a three-dimensional object model to instructions for a three-dimensional printer to form the object by building up individual layers of powder bed material.

Organosilanes

Referring to the organosilanes that can be included in the tinted anti-coalescing agent, the organosilanes can include a central silicon atom covalently coupled to multiple hydrolysable groups and to an organic group. The organic group can be bonded to the central silicon atom by a covalent bond to a carbon atom in the organic group. The organic group can be non-susceptible to hydrolysis. In various examples, the organosilane can be hydrophobic or hydrophilic. In some cases, the hydrophobic or hydrophilic nature of the organosilane can be determined by the type of organic group attached to the central silicon atom of the organosilane. In some examples, the organic group can be a hydrophobic group such as a hydrocarbon group. In such examples, the organosilane can be emulsified in the aqueous tinted anti-coalescent agent. In other examples, the organic group can be more hydrophilic. In certain examples, the organic group can be a "water-solubilizing" group, which refers to an organic group that can either make the organosilane water-soluble, or make the organosilane become water-soluble when the organosilane is hydrolyzed in the aqueous tinted anti-coalescing agent.

Figure 5:
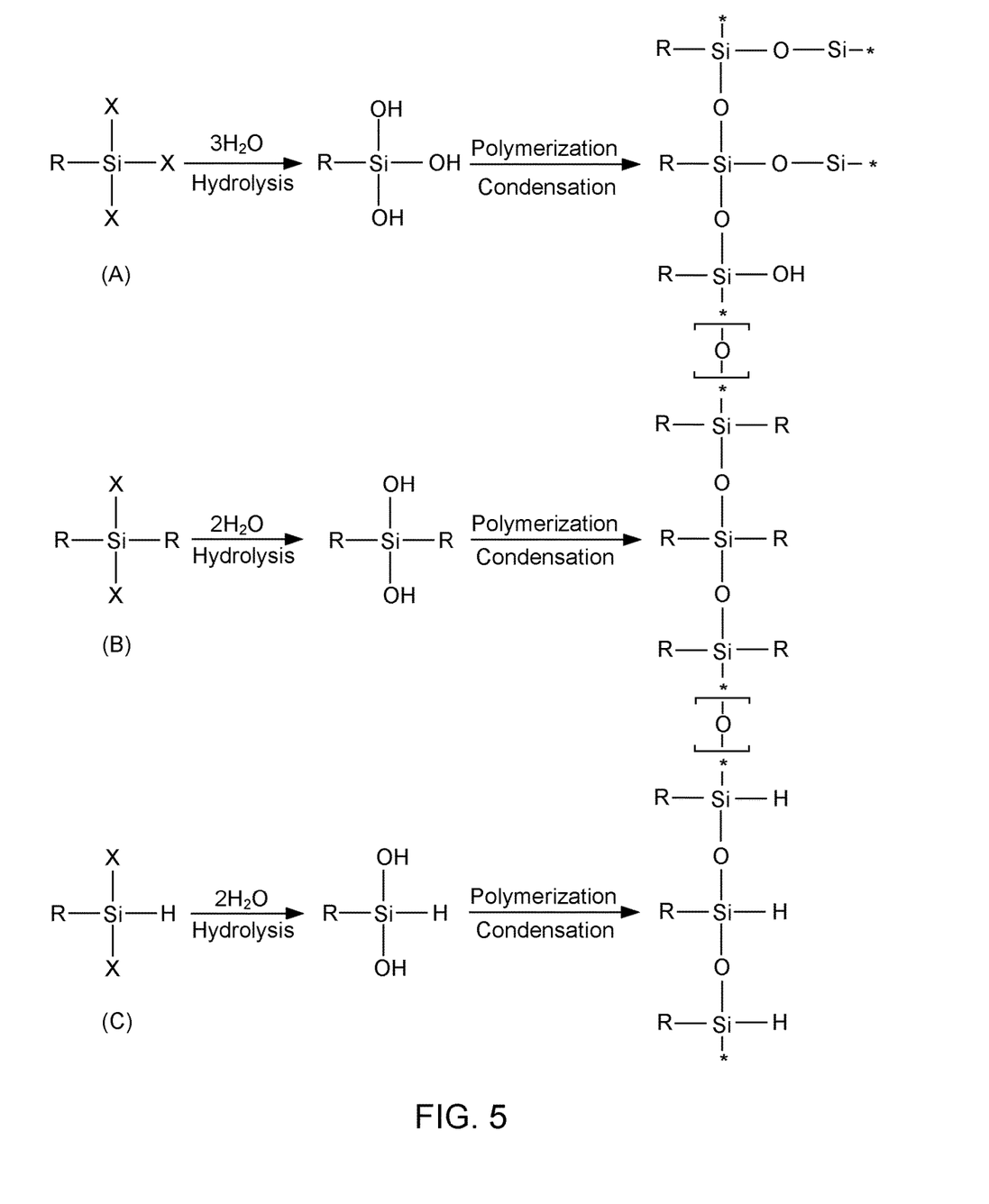
FIG. 5 illustrates multiple example organosilane compounds that can be included in a tinted anti-coalescing agent, as well as multiple example polysiloxanes that can be formed in a powder bed material, in accordance with examples of the present disclosure.

In certain examples, the organosilane can include a central silicon having both a water-solubilizing organic group and a multiple hydrolysable groups attached thereto. As there are four positions available on a central silicon, there can be one or two water-soluble groups, and there can be two or three hydrolysable groups. By way of example to illustrate the organosilane compounds schematically, FIG. 5 is provided for illustrative purposes. In this FIG., R represents water-soluble groups and X represents hydrolysable groups. For example, organosilane compound (A) includes one water-solubilizing group and three hydrolysable groups; organosilane (B) includes two water-soluble groups and two hydrolysable groups; and organosilane (C) includes one water-solubilizing group and two hydrolysable groups. Organosilane (C) also includes hydrogen at one of the four positions on the central silicon atom. In this example, the water-solubilizing group, represented by R, can independently be any water-solubilizing group that provides hydrophilic properties to the organosilane compound in solution, and which has low reactivity with other organosilane compounds when in solution within the tinted anti-coalescing agent, e.g., low enough reactivity to remain stable while in a fluid state prior to ejection from a fluid jet printhead or other ejector. Though not shown in FIG. 5, in some examples, there can be additional organosilane compounds present, such as tetraalkoxysilanes, for example. If present, they can be included at from about 0.01 wt % to about 5 wt %, from about 0.05 wt % to about 3.5 wt %, from about 0.1 wt % to about 2 wt %, or from about 0.01 wt % to about 1 wt %, based on a total weight of the tinted anti-coalescing agent. In some examples, there are no tetraalkoxysilanes present. Notably, though the various polysiloxanes are shown as linked together with a siloxane group with the oxygen shown in brackets, e.g., [—O—], this is provided by way of example, and the linking polymer therebetween can be longer, or the various structures formed can be unlinked, or there may not be all of the structures shown at (A)-(C) present in a common formulation. These structures are provided by way of example to illustrate various possible combinations and structures that can be formed.

Example water-solubilizing organic groups, or R groups, can include, for example, polyethylene oxides, amines, glycidyls (epoxides), succinic anhydrides, etc. It is noted that the water-solubilizing group, or R group, can include a water soluble group that is coupled to the central silicon atom through a linker, which can include, for example, a short alkyl chain, e.g., C1-C5 straight chained or branched alkyl group, and/or other linking groups, such as urethane, as an example. Other water-solubilizing groups can likewise be used. Example hydrolysable groups, or X groups, can include alkoxy groups, such as methoxy or ethoxy, or halogens, such as chloride or bromide. Other hydrolysable groups can likewise be used.

Two specific examples of organosilane compounds that can be used in accordance with the present disclosure are shown as Formulas I and II below.

Formula I 3-aminopropyltriethoxysilane

Formula II

N-(triethoxysilylpropyl)-O-polyethylene oxide urethane

Formula I is an alkylamine water-solubilizing group, which more specifically includes an amine water-soluble group and a propyl linker. This particular structure can be referred to more specifically as an aminopropyltriethoxysilane. This specific organosilane can provide a tinted anti-coalescing agent with a relatively high pH, e.g., about pH 11 to about 12, and thus can be used at a higher pH level or can be buffered to achieve a lower pH level, or formulated in another way to be useful for a given tinted anti-coalescing agent application. For systems where a lower pH is desired, Formula II includes a polyethylene oxide water-solubilizing group where n can be from 3 to 12, from 4 to 12, from 4 to 10, from 4 to 8, from 5 to 8, from 6 to 8, or from 4 to 6, for example. This organosilane can be particularly useful at about pH 6 to about pH 8.5, about pH 6.5 to about pH 8, or about pH 6.5 to about pH 7.5, for example. More specifically, Formula II includes a polyethylene oxide water-soluble group with a propyl urethane linker. In one example, Formula II can be referred to as an N-(triethoxysilylpropyl)-O-polyethylene oxide urethane. Other water soluble groups, other linkers (other than propyl, other than urethane, etc.), can likewise be used. Furthermore, in these particular examples, Formulas I and II depict triethoxysilanes, but it is understood that either could likewise be diethoxysilanes, trimethoxysilanes, dimethoxysilanes, trichlorosilanes, dichlorosilanes, tribromosilanes, dibromosilanes, etc. One reason triethoxysilanes are shown and described is because they may exhibit a slow enough rate of hydrolysis that, coupled with the water-solubilizing group, the organosilane can remain effectively in solution as a tinted anti-coalescing agent, but can be react quickly enough once printed into the power bed material to be effective in forming the polysiloxane barrier at a boundary of the 3D printed object. Methoxysilanes react more quickly and halosiloxanes, for example, may not be as environmentally friendly as alkoxysilanes.

Other example organosilanes that can be used are provided below as Formulas III-XIV. It is noted that various dialkoxysilanes and trialkoxysilanes below are provide by way of example. As such, example ethoxy groups can be methoxy and/or halogenated groups, and vice versa. Trialkoxy organosilanes can alternatively be dialkoxy or dihalogenated organosilanes, and vice versa, etc.

Formula III

3-aminopropyltrimethoxysilane

Formula IV

N-(2-aminoethyl)-3-aminopropyltrimethoxysilane

Formula V

N-(2-aminoethyl)-3-aminopropylmethyldimethoxysilane

Formula VI

3-(N,N-dimethtlaminopropyl)aminopropylmethyldimethoxysilane

Formula VII

N-(2-aminoethyl)-3-aminoisobutylethyldimethoxysilane

Formula VIII

N-(6-aminohexyl)aminopropyltrimethoxysilane

Formula IX

N-(2-aminoethyl)-3-aminopropyltriethoxysilane

Formula X

3-aminopropylmethyl-diethoxysilane

Formula XI

(3-trimethoxysilylpropyl)diethylenetriamine

-continued

(3-glycidoxypropyl)trimethoxysilane

Formula XII 3-(trimethoxylilylpropyl)-methylphosphonate

Formula XIII (3-triethoxysilyl)propylsuccinic anhydride

Formula XIV

Referring once again to FIG. 5, as shown, a hydrolysis reaction can introduce hydroxyl groups to the organosilane compound, which can then be polymerized or condensed to form any of a number of oligomeric or polymeric siloxanes, where are referred to herein collective as "polysiloxanes." The rate at which hydrolysis occurs upon ejecting into a powder bed material as part of a tinted anti-coalescing agent can be dependent on the number and structure of hydrolysable groups and to some extent, on the structure of the water-solubilizing group(s). Application of heat to the powder bed can, for example, promote the formation of self-polymerized polysiloxanes structures such as that shown by way of example in FIG. 5. pH modification when jetted into a layer of the powder bed material can also facilitate formation of the polysiloxanes.

In accordance with examples of the present disclosure, the powder bed material, and particularly the polymer particles used in the powder bed material, can be selected or formulated to avoid surface hydroxyl groups. In one example, the powder bed material is devoid of surface hydroxyl groups. In another example, if some surface hydroxyl groups are present, they can be presented at a deminimis concentration, e.g., due to impurities or polymers with hydroxyl end groups, but not throughout the polymer chain, etc., so that the polysiloxanes do not substantially interact or bond with the 3D object being printed significantly enough that the polysiloxanes cannot be easily removed by wiping, washing, or other simple procedure. Due to the presence of the multiple hydrolysable groups attached to the central silicon atom of the organosilane, the organosilane molecules can react with one another to form polysiloxanes. When the polymeric particles of the powder build material are selected or formulated such that there are no surface hydroxyls, or if present, at a deminimis surface concentration of hydroxyl groups, the polysiloxanes formed can remain substantially chemically independent relative to the polymeric particles.

The term "chemically independent" does not preclude all surface polymeric particle surface reactions with the organosilanes, as there may be impurities or other reasons that there can be deminimis concentrations of surface hydroxyls present within the powder build material. By "chemically independent," what is meant is that whatever bonding may occur at a surface of the printed 3D object, the bonding is insufficient to permanently incorporate the polysiloxanes formed onto a surface of the object. In other words, the polysiloxanes formed from the organosilanes are a separate polymer, without significant bonding or incorporation into the polymeric build material. Therefore, when the polysiloxane is formed around the surfaces of the three-dimensional printed object, the polysiloxane can provide a barrier to prevent caking or partial fusing of surrounding polymer particles to the surface of the three-dimensional printed object. At the same time, the polysiloxane polymer can be easily removed from the surface of the three-dimensional printed object because the polysiloxane is a separate polymer from the polymeric build material. In some examples, a more vigorous post-processing operation can occur to remove the polysiloxane, such as sand blasting or other similar methodology.

In one example of the present disclosure, the use of trialkoxysilanes in particular as the monomeric unit with a single water-solubilizing group, or R group, as shown at (A) in FIG. 5, hydrolysis can be slowed to avoid appreciable condensation in the fluid. Once in the aqueous liquid vehicle, the hydrolysable groups may be deminimis, but the hydrolysis rate can be a gatekeeper to a second rate of condensation. By slowing hydrolysis with these considerations, good printability of the tinted anti-coalescing agent can be maintained because no polysiloxanes, or a very small amount of polysiloxanes, are formed in the agent before printing. The formation of some concentration of polysiloxanes in solution is acceptable, however, provided the polysiloxanes can remain in solution, for example.

When the tinted anti-coalescing agent is formulated as an aqueous fluid, hydrolysis can be controlled to prevent early formation of the polysiloxanes by selecting a water-solubilizing group(s) that provides for keeping the organosilane in solution prior to ejection of the agent into the powder bed material layer. In further examples, buffering to a relatively neutral pH, e.g., from about pH 6 to about pH 8 or about pH 6.5 to about pH 7.5, is one approach to keeping the organosilanes (or any polysiloxanes formed in solution) appropriately solubilized.

As mentioned above, in some examples the organosilane can be more hydrophobic. The organic group that is bonded to the central silicon atom of the organosilane can be a hydrophobic group such as a hydrocarbon group. In certain examples, the organic group can include C6 to C24 aliphatic or alicyclic hydrocarbon or a C6 to C24 aliphatic or alicyclic hydrocarbon directly coupled to a heteroatom selected from the group consisting of oxygen, nitrogen, sulfur, and combinations thereof. In certain examples, the organosilane can include a hydrocarbon group. The hydrocarbon group can include either branched or straight-chained aliphatic hydrocarbons, alicyclic hydrocarbons, or a combination of aliphatic and alicyclic hydrocarbons, for example.

As with the hydrophilic organosilanes described above, the hydrophobic organosilanes can also include a central silicon atom and multiple hydrolysable moieties or groups, e.g., alkoxy groups, halogenated group, etc., that may be involved in becoming linked together by condensation to form the polysiloxanes when the emulsion becomes disrupted upon printing into the powder bed material.

The hydrophobic organosilane can be emulsified in the aqueous liquid vehicle of the tinted anti-coalescing agent using a surfactant. Specifically, the organosilanes can be included in the lipophilic phase of an emulsion. The organosilanes can include a central silicon having a lipophilic (hydrophobic) group at one or two of the four locations of the central silicon. Thus, as there are four positions available on a central silicon, there can be one or two lipophilic groups, and there can be two or three hydrolysable groups. Referring again to FIG. 5, these example organosilane compounds can also represent hydrophobic organosilanes when the R groups are hydrophobic organic groups. Three examples of organosilane compounds are shown in FIG. 5 by way of example, where R can represent lipophilic groups and X represents hydrolysable groups. For example, organosilane compound (A) includes one lipophilic group and three hydrolysable groups; organosilane (B) includes two lipophilic groups and two hydrolysable groups; and organosilane (C) includes one lipophilic group and two hydrolysable groups. Organosilane (C) also includes hydrogen at one of the four positions on the central silicon atom. In this example, the lipophilic group, represented by R, can independently include an aliphatic or alicyclic hydrocarbon, e.g., C6 to C24 straight-chained alkyl, branched alkyl, alicyclic, or a combination thereof. In some examples, the aliphatic or alicyclic hydrocarbon can be substituted with a heteroatom, such as oxygen, sulfur, or nitrogen, but such a substitution can be minimal, e.g., one or two locations, and if present, the lipophilic group still provides enough hydrophobicity to the compound for it to become emulsified into a discontinuous phase within the tinted anti-coalescing agent in the presence of the surfactant. Though not shown in FIG. 5, in some examples, there can be additional organosilane compounds present, such as tetraalkoxysilanes, for example. If present, they can be included at from about 0.01 wt % to about 5 wt %, from about 0.05 wt % to about 3.5 wt %, from about 0.1 wt % to about 2 wt %, or from about 0.01 wt % to about 1 wt %, based on a total weight of the tinted anti-coalescing agent. In some examples, there are no tetraalkoxysilanes present. Notably, though the various polysiloxanes are shown as linked together with a siloxane group with the oxygen shown in brackets, e.g., [—O—], this is provided by way of example, and the linking polymer therebetween can be longer, or the various structures formed can be unlinked, or there may not be all of the structures shown at (A)-(C) present in a common formulation. These structures are provided by way of example to illustrate various possible combinations and structures that can be formed.

Formula XV below provides an example organosilane that can be formulated and dispersed as a discontinuous phase of a tinted anti-coalescing agent in accordance with the present disclosure, as follows:

$$R_n—Si—X_p \quad \text{Formula XV}$$

where R includes a C6 to C24 aliphatic or alicyclic hydrocarbon; X is a hydrolysable group, n is 1 or 2, and p is 2 or 3. The hydrolysable group can be alkoxy, e.g., methoxy, ethoxy, etc.; or halogen.

Two specific examples of organosilane compounds that can be used in accordance with the present disclosure are shown as Formulas XVI and XVII below.

Dodecyltriethoxysilane (Formula XVI)

Hexyltriethoxysilane (Formula XVII)

In these two particular examples, Formulas XVI and XVII depict triethoxysilanes, but it is understood that either could likewise be diethoxysilanes, trimethoxysilanes, dimethoxysilanes, trichlorosilanes, dichlorosilanes, tribromosilanes, dibromosilanes, etc. The ethoxysilanes could likewise be propyloxy silanes or methoxy silanes. One reason triethoxysilanes are shown and described is because they may exhibit a slow enough rate of hydrolysis that they react at a rate that may coincide well with printing speeds, for example. Methoxysilanes react more quickly and halosiloxanes, for example, may not be as environmentally friendly as alkoxysilanes, but may still be used effectively in some examples.

In preparing an emulsified organosilane of the present disclosure, the following general method can be used, by way of example:

Combine water and surfactant, and in some instances an acid or base, e.g., acetic acid. Hydrolysis of silanes to a silanol may occur readily, but the rate of reaction can be modulated by addition of the acid and/or base, e.g., sped up in speed.

Add the organosilane with a lipophilic group, such as that described by example in Formula I, dropwise slowly over time.

Stir the mixture for several hours, e.g., 72+ hours in some examples.

If a triethoxysilane is being used, the scent of EtOH indicates hydrolysis of the silanol may be occurring.

Using this methodology, the two triethoxysilanes shown and described in Formulas XVI and XVII can be prepared with the addition of an acid to increase the reaction rate. In other examples, these materials may be prepared without adding the acid.

Referring once again to FIG. 5, as shown, a hydrolysis reaction can introduce hydroxyl groups to the organosilane compound, which can then be polymerized or condensed to form any of a number of oligomeric or polymeric siloxanes, where are referred to herein collective as "polysiloxanes." The rate at which hydrolysis occurs can be dependent on the number and structure of hydrolysable groups. Hydrolysis can occur within the tinted anti-coalescing agent prior to application to the powder bed material, for example. Application of heat to the powder bed can, for example, promote the formation of self-polymerized polysiloxanes structures such as that shown by way of example in FIG. 5. pH modification when jetted into a layer of the powder bed material can also facilitate formation of the polysiloxanes.

The hydrophobic organosilanes can form a polysiloxane barrier when applied to the powder bed material. This can help prevent surrounding polymer particles from caking or partially fusing to the surface of the three-dimensional printed object as explained above.

In one example of the present disclosure, the use of trialkoxysilanes in particular as the monomeric unit with a lipophilic group, or R group, as shown at (A) in FIG. 5, hydrolysis can occur in the tinted anti-coalescing agent in preparation for applying to the powder bed material, and after application, when the emulsion becomes disrupted, condensation can occur within the powder build material forming the polysiloxane barrier.

Definitions

It is noted that, as used in this specification and the appended claims, the singular forms "a," "an," and "the" include plural referents unless the context clearly dictates otherwise.

As used herein, "ink jetting" or "jetting" or "ejecting" refers to one specific type of application of fluids on to powder bed material using inkjet or other fluidic ejection architecture. Ink-jet architecture can include thermal or piezo architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are identified as separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and fluid agents, materials kits, compositions, and/or methods may be devised without departing from the spirit and scope of the present disclosure. The appended claims are intended to cover such modifications and arrangements.

Example 1—Preparation of Hydrophobic Organosilane Emulsion

An emulsion of a hydrophobic organosilane was prepared. The hydrophobic organosilane used in this example was hexyltriethoxysilane. The overall composition of the emulsion included 10 wt % hexyltriethoxysilane, 8 wt % of a surfactant, 81 wt % deionized water, and 1 wt % acetic acid. The emulsion was made by first mixing the surfactant, water, and acetic acid. The hexyltriethoxysilane was then slowly added to this mixture while stirring. The resulting mixture was agitated for 15-20 minutes and then allowed to stand undisturbed for 48-72 hours at room temperature. This is expected to allow complete hydrolysis of the silane to a silanol and to achieve stable emulsion equilibrium.

Example 2—Preparation of Tinted Anti-Coalescing Agent with Hydrophobic Organosilane Emulsion A tinted anti-coalescing agent (TACA A) including the hydrophobic organosilane emulsion of Example 1 was prepared in accordance with Table 1, as follows:

TABLE 1

| Ingredient | TACA A (wt %) |
|---|---|
| Organic Co-solvent | 19 |
| Organosilane (Ex. 1)* | 5 |
| Surfactant | 0.85 |
| Anti-kogation Compound | 0.5 |
| Chelator | 0.02 |
| Biocide | 0.2 |
| Buffer | 0.2 |
| Black Dye | 1 |
| Water | Balance |

*The organosilane is introduced by adding the emulsion from Example 1, but the amount of organosilane in Table 1 represents the concentration of just that active organosilane compound.

Example 3—Preparation of Tinted Anti-Coalescing Agent with Hydrophilic Organosilane Another tinted anti-coalescing agent (TACA B) was formulated including a hydrophilic organosilane: N-(triethoxysilylpropyl)-O-polyethylene oxide urethane, as shown in Table 2.

TABLE 2

| Ingredient | TACA B (wt %) |
|---|---|
| Organic Co-solvent | 19 |
| N-(triethoxysilylpropyl)-O-Polyethylene Oxide Urethane | 7.5 |
| Surfactant | 0.85 |
| Anti-kogation Compound | 0.5 |
| Chelator | 0.02 |
| Biocide | 0.25 |
| Buffer | 0.1 |
| Black Dye | 1 |
| Water | Balance |

Example 4—Performance of Tinted Anti-Coalescing Agent with Hydrophobic Organosilane Emulsion The tinted anti-coalescing agent (TACA A) with the hydrophobic organosilane emulsion was tested for print performance. First, the agent was loaded in a two-dimensional inkjet printer and printed to test the jettability of the agent. The printing was successful and the inkjet print nozzles had good nozzle health.

The tinted anti-coalescing agent was then used in a MULTI-JET FUSION 3D® test three-dimensional printer (HP, Inc., USA). Computer three-dimensional object models were used to prepare an object referred to as a "gap checker" designed to evaluate the effectiveness of the tinted anti-coalescing agent. The gap checker was designed to print a horizontal substrate or base with several pairs of vertical tiles (square) extending upward therefrom. The object was designed so that the pairs of vertical tiles had a gap therebetween (major surface facing major surface separated by the gap) ranging in distance between tiles of a pair from 0.1 mm to 0.5 mm. Tinted anti-coalescing agent was deposited between the two plates of the various pairs during the build process. For comparison, a control detailing agent was prepared that included water to evaporatively cool powder bed material onto which the detailing agent is applied. The control detailing agent did not include the black dye or the organosilane emulsion. The design of the "gap checker" object was such that if there was adequate separation between the individual pairs of plates, one of the plates could be removed or separated from the other by breaking one of the plates away from the other while keeping the other plate undamaged as attached to the horizontal substrate or base. To achieve this, one of the two vertical plates of the various pairs was not printed to be connected to the horizontal substrate, e.g., it was connected to the other vertical plate with tinted anti-coalescing agent and powder build material therebetween. Thus, the more tiles that can be separated from their opposing tile of the pair, the better the gap clearance. For example, if a pair of tiles can be separated down to 0.2 mm, then that would be better performance for the tinted anti-coalescing agent than if the pairs of tiles could be separated at gaps no smaller than 0.3 mm. To account for variability, the parts were printed twice in both a default orientation and a 180° rotated orientation to account for potential temperature non-uniformity in the powder bed material as related to the three-dimensional printing apparatus. The tile pairs printed with the tinted anti-coalescing agent therebetween was able to provide acceptable gap clearance down to 0.3 mm, failing at 0.2 mm and 0.1 mm. The tile pairs printed with the control DA therebetween was also able to provide acceptable gap clearance down to 0.3 mm, failing at 0.2 mm and 0.1 mm. Thus, the tinted anti-coalescing agent provided the same level of thermal bleed control as the control detailing agent. Additionally, the gap surface had a more uniform black color when the tinted anti-coalescing agent was used compared to the control DA. A second test was performed with the three-dimensional printed objects turned 180° in the powder bed to control for possible temperature variations in different areas of the powder bed. The gap clearance results of the second test were the same.

The powder bed material used for this example was 100 wt % polyamide-12 powder, and the fusing agent used was a black fusing agent that includes a black pigment as the radiation absorber. The tinted anti-coalescing agent formulation used is shown in Table 1. Other than the selection of tinted anti-coalescing agent vs. detailing agent, the printing parameters were identical.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A multi-fluid kit for three-dimensional printing comprising:
   a fusing agent comprising water and an electromagnetic radiation absorber, wherein the electromagnetic radiation absorber absorbs radiation energy and converts the radiation energy to heat; and
   a tinted anti-coalescing agent consisting of:
      an aqueous liquid vehicle,
      a colored dye dissolved in the aqueous liquid vehicle,
      an organic co-solvent,
      a surfactant,
      an anti-kogation compound,
      a chelator,
      a biocide,
      a buffer, and
      an organosilane having a central silicon atom covalently coupled to multiple hydrolysable groups and to an organic group by covalent bonding to a carbon atom in the organic group, wherein the organic group is not susceptible to hydrolysis.

2. The multi-fluid kit of claim 1, wherein the hydrolysable groups include alkoxy groups, halogen groups, or a combination thereof.

3. The multi-fluid kit of claim 1, wherein the organic group of the organosilane includes a C6 to C24 aliphatic or alicyclic hydrocarbon or a C6 to C24 aliphatic or alicyclic hydrocarbon directly coupled to a heteroatom selected from the group consisting of oxygen, nitrogen, sulfur, and combinations thereof, and wherein the organosilane is emulsified in the aqueous liquid vehicle by the surfactant.

4. The multi-fluid kit of claim 1, wherein the organic group of the organosilane includes a polyethylene oxide, polyethylene oxide urethane, amine, glycidyl, or succinic anhydride, and wherein the organosilane is dissolved in the aqueous liquid vehicle.

5. The multi-fluid kit of claim 1, wherein the organosilane is present in the tinted anti-coalescing agent at from about 1 wt % to about 20 wt %.

6. The multi-fluid kit of claim 1, wherein the colored dye is a black dye.

7. The multi-fluid kit of claim 1, wherein the colored dye is present in the tinted anti-coalescing agent at an amount from about 0.1 wt % to about 3 wt %.

8. The multi-fluid kit of claim 1, wherein the tinted anti-coalescing agent comprises from about 60 wt % to about 93 wt % water and from about 5 wt % to about 35 wt % of the organic co-solvent.

9. The multi-fluid kit of claim 1, wherein the colored dye is present in the tinted anti-coalescing agent at an amount from about 0.1 wt % to about 2 wt %.

10. A three-dimensional printing kit comprising:
a powder bed material comprising polymer particles;
a fusing agent comprising water and an electromagnetic radiation absorber, wherein the electromagnetic radiation absorber absorbs radiation energy and converts the radiation energy to heat; and
a tinted anti-coalescing agent consisting of:
an aqueous liquid vehicle,
a colored dye dissolved in the aqueous liquid vehicle,
an organic co-solvent,
a surfactant,
an anti-kogation compound,
a chelator,
a biocide,
a buffer, and
an organosilane having a central silicon atom coupled to multiple hydrolysable groups and to an organic group by covalent bonding to a carbon atom in the organic group, wherein the organic group is not subject to hydrolysis.

11. The three-dimensional printing kit of claim 10, wherein the polymer particles include polyamide 6, polyamide 9, polyamide 11, polyamide 12, polyamide 6/6, polyamide 6/12, polyethylene, thermoplastic polyurethane, polypropylene, polyester, polycarbonate, polyether ketone, polyacrylate, polystyrene powder, wax, or a combination thereof.

12. The three-dimensional printing kit of claim 10, wherein the organic group of the organosilane includes: a C6 to C24 aliphatic or alicyclic hydrocarbon; a C6 to C24 aliphatic or alicyclic hydrocarbon directly coupled to a heteroatom selected from the group consisting of oxygen, nitrogen, sulfur, and combinations thereof; polyethylene oxide; polyethylene oxide urethane; amine; glycidyl; or succinic anhydride.

13. The three-dimensional printing kit of claim 10, wherein the tinted anti-coalescing agent comprises from about 60 wt % to about 93 wt % water, from about 5 wt % to about 35 wt % of the organic co-solvent, from about 0.1 wt % to about 3 wt % of the colored dye, and from about 1 wt % to about 20 wt % of the organosilane, based on the total weight of the tinted anti-coalescing agent.

14. The three-dimensional printing kit of claim 10, wherein the colored dye is present in the tinted anti-coalescing agent at an amount from about 0.1 wt % to about 2 wt %.

15. A method of making a three-dimensional printed object comprising:
iteratively applying individual powder bed material layers of polymer particles to a powder bed;
based on a three-dimensional object model, selectively jetting a fusing agent onto the individual powder bed material layers at build areas where the three-dimensional printed object is being formed, wherein the fusing agent comprises water and an electromagnetic radiation absorber;
based on the three-dimensional object model, selectively jetting a tinted anti-coalescing agent onto the individual powder bed material layers laterally at a border region between a first area where powder bed material of the individual powder bed material layers is contacted by the fusing agent and a second area where the powder bed material of the individual powder bed material layers is not contacted by the fusing agent, wherein the tinted anti-coalescing agent consists of:
an aqueous liquid vehicle,
a colored dye dissolved in the aqueous liquid vehicle,
an organic co-solvent,
a surfactant,
an anti-kogation compound,
a chelator,
a biocide,
a buffer, and
an organosilane having a central silicon atom coupled to multiple hydrolysable groups and to an organic group by covalent bonding to a carbon atom in the organic group, wherein the organic group is not subject to hydrolysis; and
exposing the powder bed to energy to selectively fuse the polymer particles in contact with the radiation absorber to form a fused polymer matrix at the individual powder bed material layers as well as form a polysiloxane from the organosilane.

16. The method of claim 15, wherein the organic group of the organosilane includes: a C6 to C24 aliphatic or alicyclic hydrocarbon; a C6 to C24 aliphatic or alicyclic hydrocarbon directly coupled to a heteroatom selected from the group consisting of oxygen, nitrogen, sulfur, and combinations thereof; polyethylene oxide; polyethylene oxide urethane; amine; glycidyl; or succinic anhydride.

17. The method of claim 15, wherein the tinted anti-coalescing agent comprises from about 60 wt % to about 93 wt % water, from about 5 wt % to about 35 wt % of the organic co-solvent, from about 0.1 wt % to about 3 wt % of the colored dye, and from about 1 wt % to about 20 wt % of the organosilane.

18. The method of claim 15, wherein the colored dye is present in the tinted anti-coalescing agent at an amount from about 0.1 wt % to about 2 wt %.

* * * * *